United States Patent
Owens

(10) Patent No.: US 11,495,954 B2
(45) Date of Patent: Nov. 8, 2022

(54) ROUTING APPARATUS, KIT AND SYSTEM FOR USE WITH AN ELECTRIC CHARGING CABLE, AND METHODS OF USING SAME

(71) Applicant: James L. Owens, Waterford, MI (US)

(72) Inventor: James L. Owens, Waterford, MI (US)

( * ) Notice: Subject to any disclaimer, the term of this patent is extended or adjusted under 35 U.S.C. 154(b) by 974 days.

(21) Appl. No.: 16/244,815

(22) Filed: Jan. 10, 2019

(65) Prior Publication Data

US 2019/0214807 A1 Jul. 11, 2019

Related U.S. Application Data

(60) Provisional application No. 62/615,797, filed on Jan. 10, 2018.

(51) Int. Cl.
| | |
|---|---|
| *H02G 11/02* | (2006.01) |
| *B65H 75/44* | (2006.01) |
| *B60L 53/18* | (2019.01) |
| *B65H 75/36* | (2006.01) |
| *B65H 57/26* | (2006.01) |
| *B65H 57/14* | (2006.01) |
| *B65H 57/28* | (2006.01) |

(52) U.S. Cl.
CPC .............. *H02G 11/02* (2013.01); *B60L 53/18* (2019.02); *B65H 57/14* (2013.01); *B65H 57/26* (2013.01); *B65H 57/28* (2013.01); *B65H 75/368* (2013.01); *B65H 75/4402* (2013.01); *B65H 75/446* (2013.01); *B65H 2701/34* (2013.01)

(58) Field of Classification Search
CPC ......... H02G 11/02; B60L 53/18; B60L 57/14; B60L 57/26; B60L 57/28

USPC ........................................................ 191/12
See application file for complete search history.

(56) References Cited

U.S. PATENT DOCUMENTS

| | | | | |
|---|---|---|---|---|
| 3,444,779 | A * | 5/1969 | Buell | F41F 3/055 |
| | | | | 89/1.811 |
| 4,064,862 | A * | 12/1977 | Groner | F41B 5/105 |
| | | | | 124/900 |
| 4,423,588 | A * | 1/1984 | Garcia | B65H 57/28 |
| | | | | 57/127.5 |
| 4,523,423 | A * | 6/1985 | Bouffard | D07B 3/022 |
| | | | | 57/64 |
| 4,896,495 | A * | 1/1990 | Sperling | D07B 7/06 |
| | | | | 57/127.5 |

(Continued)

*Primary Examiner* — Alexander Gilman
(74) *Attorney, Agent, or Firm* — Carrier Blackman & Associates, P.C.; Joseph P. Carrier; William D. Blackman

(57) ABSTRACT

A cable routing apparatus, for supporting an electric charging cable, includes a mounting plate and a pulley-bracket assembly, which is pivotally attachable to the mounting plate. The pulley-bracket assembly includes a pulley support member having a pulley support plate and at least one pulley support arm extending downwardly from the support plate. The pulley-bracket assembly further includes a pulley wheel for supporting part of the cable thereon, and a pulley axle extending through a central hub of the pulley wheel. A housing may be provided for covering the pulley-bracket member, and parts of the pulley support member may, optionally, be integrated into the housing. A kit including two of the described cable routing apparatus along with an intermediate pulley bracket and other components, as well as a method of installing the kit in a garage to provide a cable routing system are also described.

20 Claims, 19 Drawing Sheets

(56) References Cited

U.S. PATENT DOCUMENTS

| | | | | |
|---|---|---|---|---|
| 4,899,988 | A * | 2/1990 | Mills | B65H 63/024 254/374 |
| 5,054,462 | A * | 10/1991 | Larson | F41B 5/10 124/900 |
| 6,338,450 | B1 * | 1/2002 | Schwendinger | B60L 53/31 191/12 R |
| 9,238,416 | B2 | 1/2016 | Alford et al. | |
| 9,487,100 | B2 | 11/2016 | Hamrin et al. | |
| 9,531,179 | B1 * | 12/2016 | Ferguson | H02G 1/04 |
| 10,280,035 | B2 * | 5/2019 | Zheng | B65H 59/387 |
| 11,014,463 | B2 * | 5/2021 | Bianco | B65H 75/4471 |
| 2005/0035245 | A1 * | 2/2005 | Morales | F16M 13/02 248/125.2 |
| 2006/0196986 | A1 * | 9/2006 | Gremmels | B25H 1/0057 242/371 |
| 2010/0105507 | A1 * | 4/2010 | Gunton | E06B 9/70 74/606 R |
| 2010/0170159 | A1 * | 7/2010 | Takeuchi | B60J 5/06 49/360 |
| 2011/0074351 | A1 * | 3/2011 | Bianco | B60L 53/31 320/109 |
| 2012/0013300 | A1 * | 1/2012 | Prosser | B60L 3/04 320/109 |
| 2012/0032635 | A1 * | 2/2012 | Prosser | B60L 53/18 320/109 |
| 2012/0048983 | A1 * | 3/2012 | Bianco | B60L 53/18 242/388.9 |
| 2012/0305870 | A1 * | 12/2012 | Ruef | F16H 55/48 254/390 |
| 2017/0093139 | A1 * | 3/2017 | Ferguson | H02G 11/02 |
| 2017/0096864 | A1 * | 4/2017 | Blair | B65H 75/4484 |
| 2017/0288457 | A1 * | 10/2017 | Peitzke | B61B 9/00 |
| 2018/0065503 | A1 * | 3/2018 | Higuchi | B60R 16/0231 |
| 2019/0209878 | A1 * | 7/2019 | Newing | A62B 35/0056 |
| 2019/0214807 | A1 * | 7/2019 | Owens | B65H 57/14 |

* cited by examiner

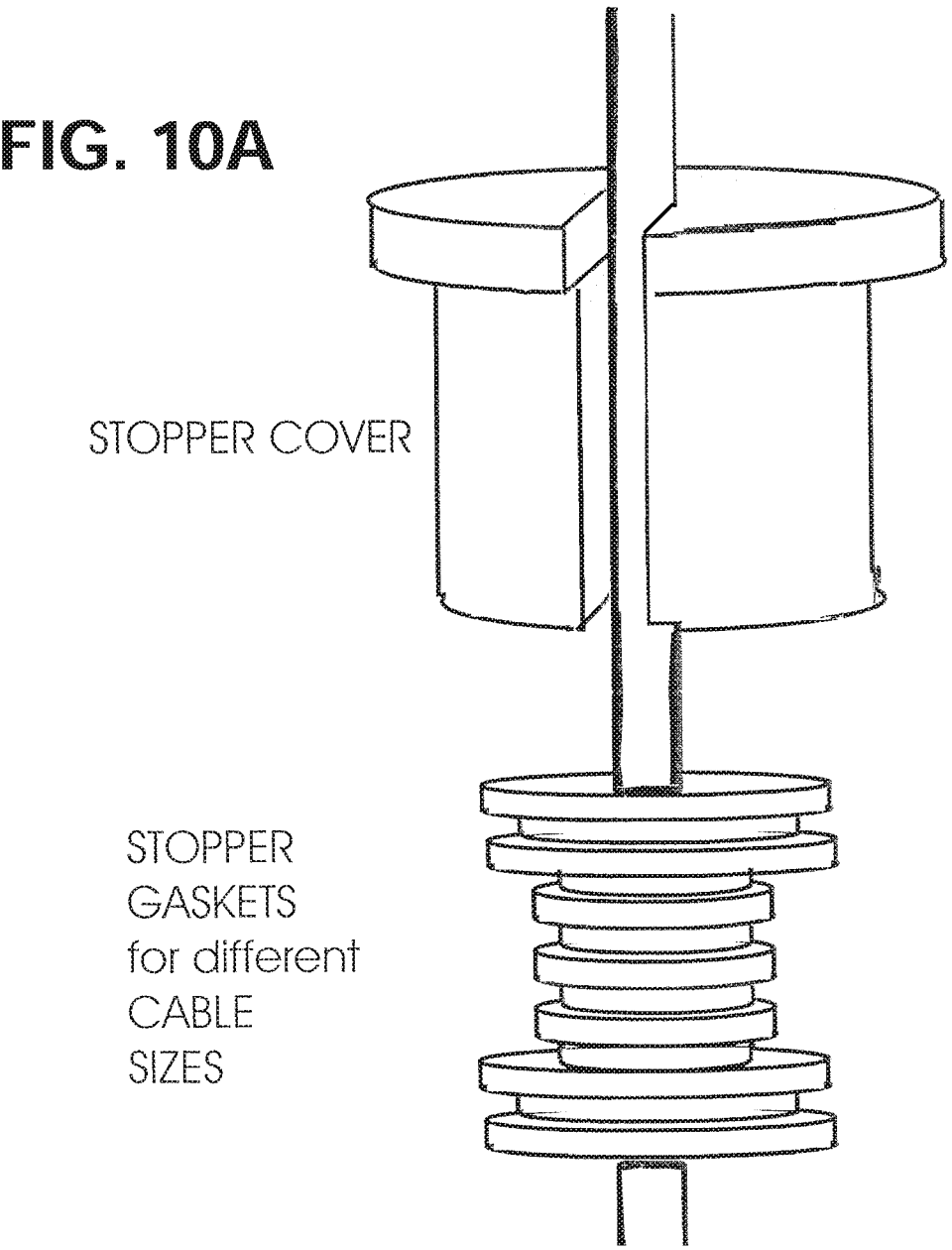

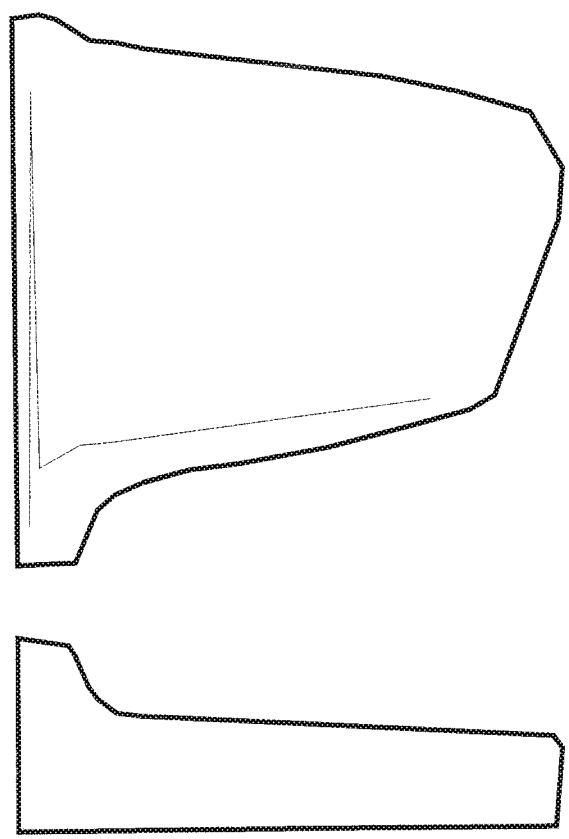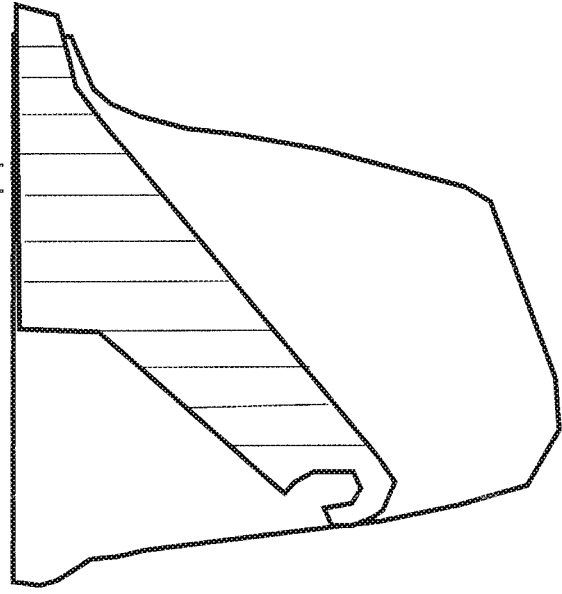
FIG. 11D  FIG. 11C  FIG. 11B  FIG. 11A

ROUTING APPARATUS, KIT AND SYSTEM FOR USE WITH AN ELECTRIC CHARGING CABLE, AND METHODS OF USING SAME

CROSS-REFERENCE TO RELATED APPLICATIONS

The present application claims priority under 35 U.S.C. 119(e), based on U.S. provisional patent application 62/615,797, filed Jan. 10, 2018. The entire disclosure of the above-referenced priority document, including specification, claims, and drawings, is incorporated by reference herein.

BACKGROUND OF THE INVENTION

Field of the Invention

The present invention relates to a cable routing apparatus, kit and system for use with an electric charging cable, and to a method of using the routing apparatus, kit and system hereof.

More particularly, the present invention relates to a cable routing kit and system configured for use with a charging cable suitable for use in charging an electric vehicle which may be a car, truck, golf cart or recreational vehicle, where the routing apparatus, kit and/or system is mountable in a residential garage, as well as methods of installing and using such a cable routing kit and system.

Background Art

Electric vehicles, also known as EVs for short, are becoming more and more mainstream. A number of different charging systems are known for use with electric vehicles. Examples of some of the known charging systems and related hardware include those described in U.S. Pat. Nos. 9,238,416 and 9,487,100, as well as the products sold by Evocharge, Inc. of Los Angeles, Calif., including their "Evo-reel" product.

Although the known devices have some utility for their intended purposes, a need still exists in the art for an improved cable routing apparatus, kit and system for use with an electric charging cable, and to methods of using the cable routing apparatus, kit and system hereof.

In particular, there is a need for a simple and convenient charging cable routing kit and system configured for use with a charging cable for an electric vehicle, where the routing system is mountable in a residential garage.

SUMMARY OF THE INVENTION

The present invention provides a cable routing apparatus, which may be part of a cable routing kit and system. The charging cable routing kit and system hereof provides a convenient way for a user to charge an electric vehicle at home. The charging cable routing kit and system allows a user to store the cable in an overhead position in the user's garage.

With this convenient appliance, the user can easily keep their electric vehicle charged when it is parked in the garage.

When the charging cable routing kit and system hereof is installed in a user's garage and the vehicle is parked in its normal spot inside of the garage, a distal, or charging end of the cable is located close to the vehicle's charge-port. When the user drives into the garage, he or she simply reaches up and pulls the cable down for charging.

When the user is preparing to leave the garage, he or she simply unplugs the cable and releases it, whereupon the charging end of the cable is easily retractable to an out-of-the way overhead storage position.

A cable routing apparatus in connection with a first illustrative embodiment hereof is provided for use with a charging cable, and the cable routing apparatus includes a mounting plate configured to be fixedly attached to a ceiling in a substantially horizontal configuration, the mounting plate having a through hole formed centrally therein.

The cable routing apparatus also includes a pulley-bracket assembly provided for pivotal attachment to the mounting plate, the pulley-bracket assembly including a pulley support member with a pulley support plate, and at least one pulley support arm for attaching to a first side portion of the pulley support plate. The at least one pulley support arm has an end portion with an opening formed therein to receive an end portion of a pulley axle.

Optionally, the cable routing apparatus may also include a fastener such as an elevator bolt, rivet or other suitable connector for pivotally attaching the pulley bracket assembly to the mounting plate at the through hole.

The pulley-bracket assembly also includes a pulley wheel having an arcuate groove extending therearound to receive and support a portion of the cable therein, and a pulley axle having a central axis extending through a central hub of the pulley wheel.

Another optional feature that may be part of the cable routing apparatus according to the invention is a hollow housing member for covering the pulley bracket assembly. Where used, the housing member may include first and second shells, which may each having an L-shaped flange on a lower end thereof, the flanges cooperating to define a groove configured to slidably receive a latch clip. Optionally, in one modified version of the invention, the arms of the pulley support member may be integrally formed inside of the housing shells.

In one aspect of the invention, the pulley support plate may have a slot formed therein to slidably receive a portion of a connector, and to permit pivotal attachment of the pulley-bracket assembly to the mounting plate.

As noted above, where used, the housing member may include first and second housing shells having first and second pulley support arms integrally formed therein, respectively, to provide the at least one pulley support arm.

Optionally, the pulley support member may include a pulley support plate, a first pulley support arm for attaching to a first side portion of the pulley support plate, and a second pulley support arm for attaching to a second side portion of the pulley support plate, each of the pulley support arms having an end portion with an opening formed therein to receive an end of the pulley axle.

Another aspect of the present invention provides a cable routing kit including two of the cable routing apparatus as described above, and an intermediate pulley bracket assembly. The intermediate pulley bracket assembly is a simplified version of the main cable routing apparatus, and includes an intermediate mounting plate for attachment to the ceiling. The intermediate mounting plate used for the intermediate pulley bracket may be the same as the mounting plate used for the main cable routing apparatus.

The intermediate pulley bracket assembly also includes at least one side bracket attached to and extending downwardly from the intermediate mounting plate, and a pulley with a pulley wheel having an arcuate groove extending therearound to receive a portion of the cable therein, and a pulley axle having a central axis extending through a central hub of the pulley wheel. The pulley used for the intermediate pulley bracket may be the same as the pulley used for the main pulley-bracket assembly of the cable routing apparatus.

The kit also includes two stoppers for attaching to the charging cable.

Another aspect of the present invention provides a method of installing the cable routing kit hereof in a garage having a wall, a ceiling and an electric vehicle charging cable with a proximal end close to the wall.

The method includes a first step of inserting a connector of a first cable routing apparatus through a through hole of a mounting plate of a first cable routing apparatus, with a threaded shaft of the connector extending downwardly.

Then, the method includes a step of attaching the mounting plate of the first cable routing apparatus to a ceiling joist in a first area of the ceiling at a location proximate the wall, using a plurality of fasteners.

Then, the method includes a step of placing a pulley support plate of a first pulley bracket assembly over the threaded shaft of the connector, and threadably installing a retaining nut on the threaded shaft to pivotally attach the first pulley bracket assembly to the mounting plate.

The method also includes steps of inserting a connector of a second cable routing apparatus through a through hole of a mounting plate of the second cable routing apparatus, with a threaded shaft thereof extending downwardly, attaching the mounting plate of the second cable routing apparatus to a ceiling joist in a second area of the ceiling at a location proximate a parking area of an electric vehicle, using a plurality of fasteners, placing the pulley support plate of the second pulley bracket assembly over the threaded shaft of the connector of the second cable routing apparatus, and threadably installing a retaining nut on the threaded shaft to pivotally attach the second pulley bracket assembly to the second mounting plate.

The method further includes a step of attaching the mounting plate of the intermediate pulley bracket assembly to a ceiling joist in a third area of the ceiling at an intermediate location proximate between the first location and the second location, using a plurality of fasteners.

In addition to the above, the method includes a step of installing the cable, including placing parts of the electric vehicle charging cable over the pulley wheels of the first cable routing apparatus, the intermediate pulley bracket assembly and the second cable routing apparatus, respectively.

Some of the design features of the charging cable routing apparatus, kit and system hereof include the fact that the charging cable is stored up off the floor, which results in:

No tripping over it.
No reaching down to retrieve it.
No danger of running over it.
No need to coil it on a wall attachment.
No wear on the cable from dragging it on the floor.
No heavy pulling on the cable to retrieve it from a spring loaded or tension coil.
Since the cable does not normally touch the floor, it is kept relatively clean.

The charging cable can easily be removed from the charging cable routing and system after initial installation. The kit according to the present invention may include a "picker stick" that helps the user lift it on to and off of the pulleys. This enables a user to easily remove or install the cable as needed. The user can therefore, take the cable in the vehicle when the need arises.

No matter what the user's garage layout is, the charging cable routing kit and system can be tailored to fit the user's garage.

For a more complete understanding of the invention, the reader is directed to read the following detailed description section, in conjunction with a review of the drawings. Throughout the following description and in the drawings, like numbers refer to like parts.

BRIEF DESCRIPTION OF THE DRAWINGS

FIG. 10A is a detail view showing a stopper cover and stopper gasket installed on the charging cable and spaced away from one another. The stopper cover may be provided with holes, fasteners or other mechanism to attach either the counterweight or other cable tensioning device.

FIGS. 11A-11D are inner plan, side plan, outer plan and top views of a housing shell having a pulley support arm integrally formed as a part thereof, according to a modified embodiment of a cable routing apparatus according to the invention.

DETAILED DESCRIPTION OF ILLUSTRATIVE EMBODIMENTS

It should be understood that only structures and methodology needed for illustrating selected embodiments of the present invention are described herein. Other conventional structures, and those of ancillary and auxiliary components of the system, will be known and understood by those skilled in the art.

Figure 1A:
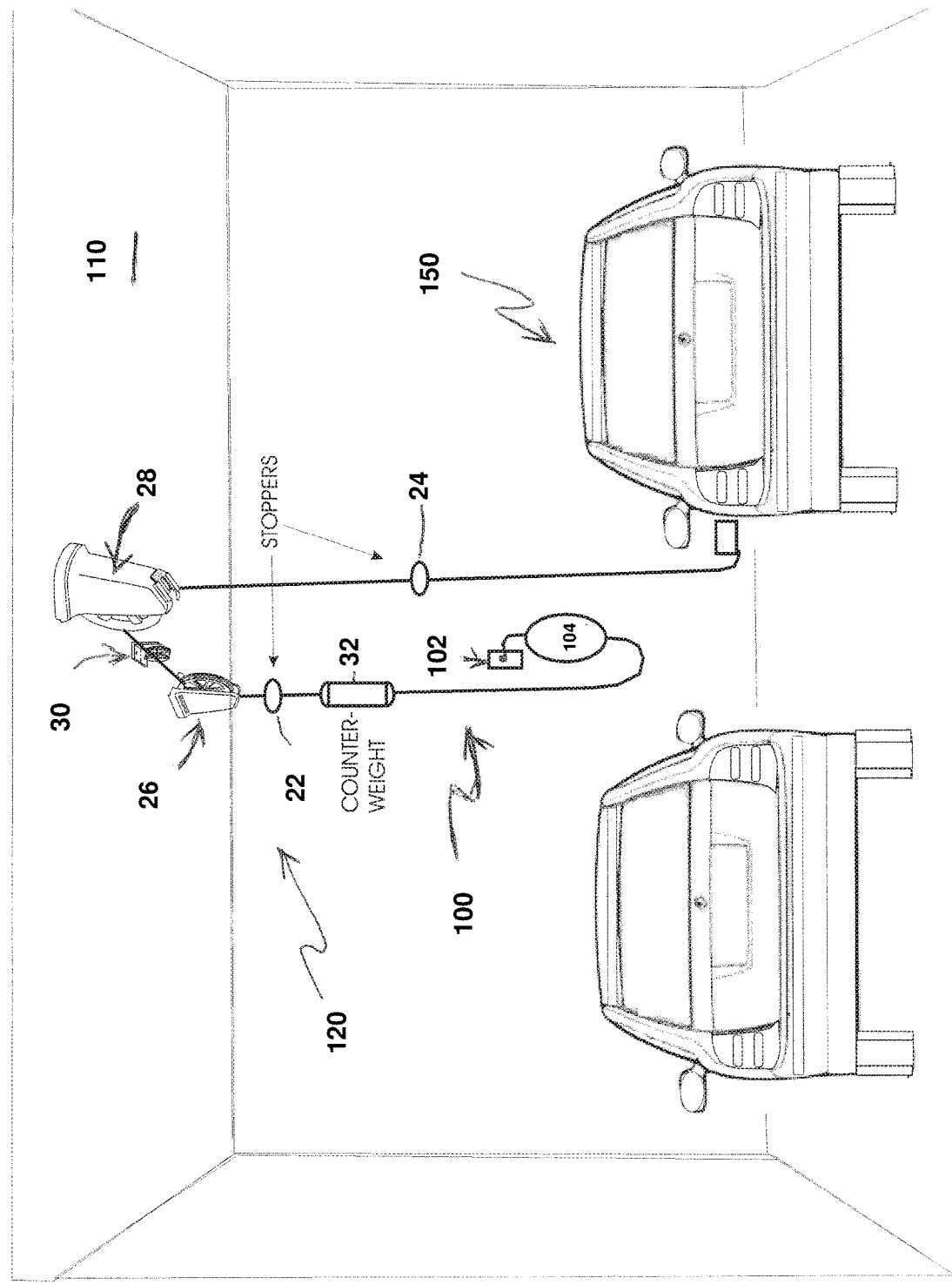
FIG. 1A is a perspective view showing a first configuration of a cable routing system and apparatus, in connection with a first illustrative embodiment of the present invention, installed in a residential garage, and used in connection with an electric vehicle charging cable.

Referring now to FIG. 1A, a cable routing system according to a first illustrative embodiment of the present invention, for routing an electric charging cable, is shown installed in a garage, in a configuration where the power source is in a generally central location.

Figure 1B:
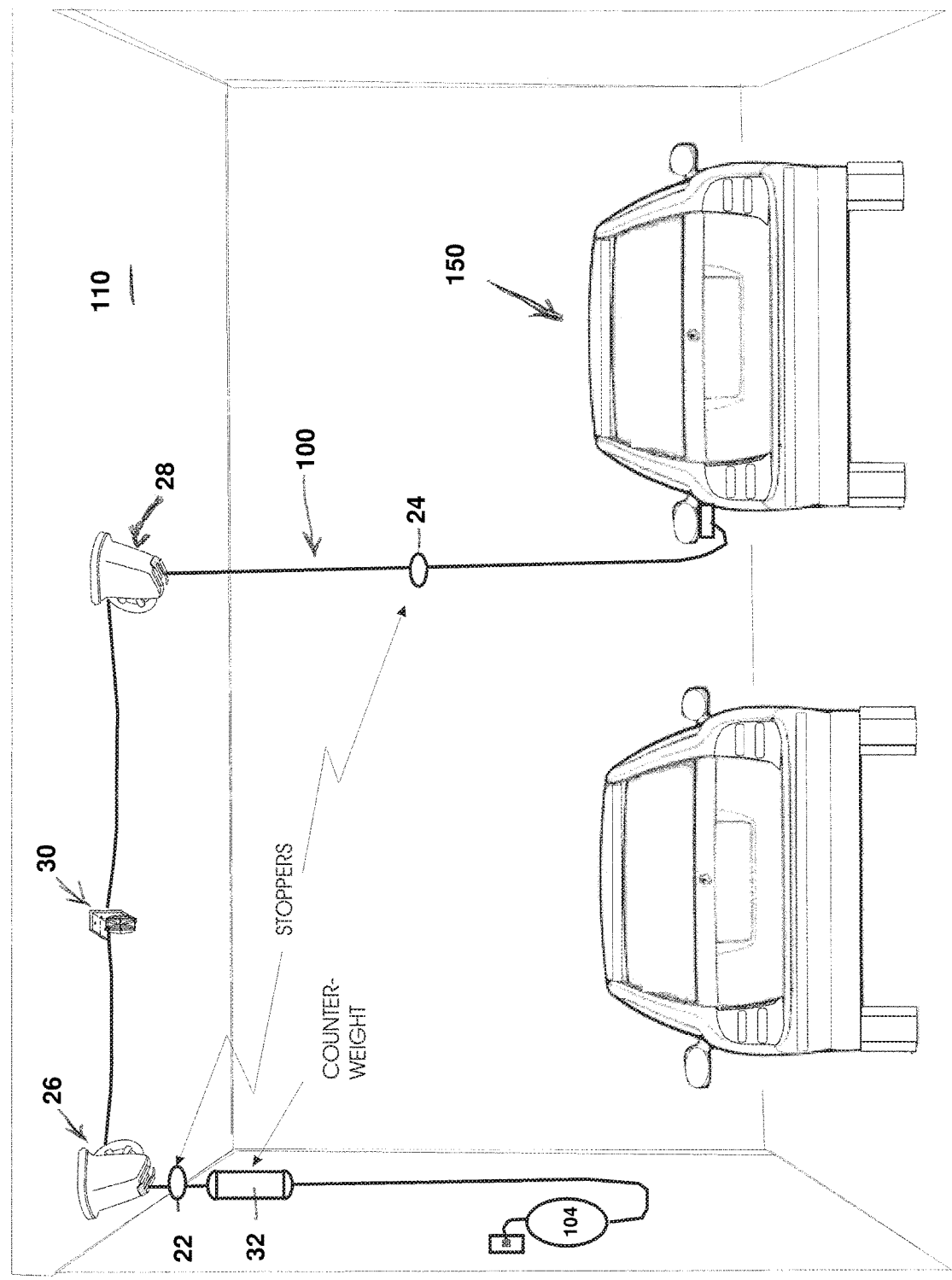
FIG. 1B is a perspective view showing a second configuration of the cable routing system and apparatus installed in a residential garage and used in connection with an electric vehicle charging cable.
Figure 1C:
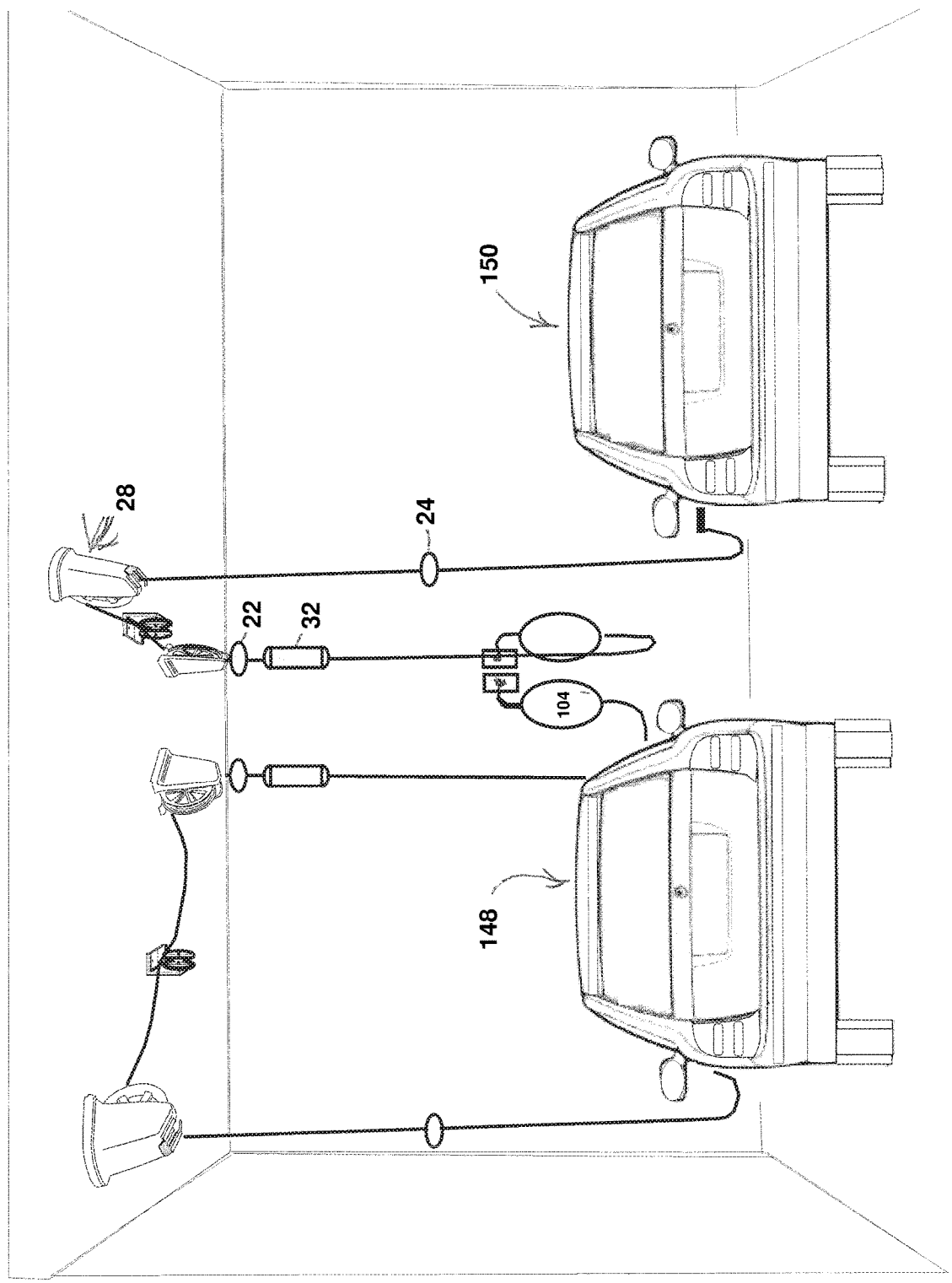
FIG. 1C is a perspective view showing a residential garage with two systems according to the invention installed therein, to permit simultaneous charging of two electric vehicles.

Alternative configurations for installing the system 120 are shown in FIGS. 1B and 1C. FIG. 1B illustrates a garage in which the power source 102 is located on a side wall of the garage, and the vehicle 150 to be charged is spaced away from the power source. FIG. 1C illustrates a garage in which two systems 120 according to the invention have been installed, to enable simultaneous charging of two electric vehicles 148, 150.

All of the main components of the system hereof may be sold as a kit for do-it-yourself installation by an end user. The kit is shown generally at 20 in FIG. 2, and when the kit is installed in a user's garage, it provides a cable routing system 120.

The charging cable is shown at 100 in FIG. 1A, and is not part of the kit and system according to the present invention, per se. The charging cable 100 is provided for recharging an electrically powered vehicle such as that shown at 150 in FIG. 1A.

The charging cable 100 is configured to either plug into a home outlet, such as that shown at 102, or to be permanently hard-wired to the home's electrical system. The charging cable 100 includes a charging control unit, commonly referred to as Electric Vehicle Service Equipment (EVSE) 104, which is part of the cable, is original equipment sold by the vehicle manufacturer, and also does not form part of the present invention.

Each of the kit 20 and system 120 according to the invention generally includes selected components shown in FIG. 1A and also in FIG. 2 as will be discussed below, although some of these components may be optional or may be modified, as further described herein, and standardized accessories including screws, nuts, and tie-down securing straps are conventional and may be purchased separately.

Each of the kit 20 and system 120 includes first and second stoppers 22, 24 for attachment to spaced-apart portions of the charging cable 100, each of the stoppers being wider than a width of the cable 100.

Each of the kit 20 and system 120 also includes a first (proximal) main cable guide apparatus 26 for installation on a ceiling of the garage near the power outlet 102, as shown. The first main cable guide apparatus 26 is also called the proximal cable guide apparatus because it is located closest to the power source.

Each of the kit 20 and system 120 further includes a second (distal) main cable guide apparatus 28 which is similar to the first main cable guide apparatus 26, and the kit and system also includes one or more intermediate bracket members 30. The second main cable guide apparatus 28 may be slightly different from the first main cable guide apparatus 26 as needed, in order to reflect its location away from the power source and close to the charging connector for the vehicle 150.

The intermediate bracket member 30 is installed on the ceiling 110 at a selected intermediate position between the first and second main cable guide apparatus 26, 28, as shown.

Optionally, the kit 20 and system 120 may additionally include a counterweight 32 for attaching to a portion of the cable 100 spaced away from the vehicle 150, to assist in balanced movement of the cable. Where used, the counterweight 32 may be a hollow member capable of being filled either with sand or with water by an end user of the system. The counterweight is provided to balance the weight of the charging connector at the vehicle end of the cable, to facilitate easy up-and-down movement of the connector.

As an alternative to the counterweight, a relatively long bungee cord may be provided between the cable between the stopper 22 and a low point either on the floor or on the wall near the floor. Another option which could be used in place of the bungee cord could be a spring, as an alternative cable retractor which is equivalent in function.

The first main cable guide apparatus 26 is shown in perspective view in FIG. 3A and in exploded view in FIG. 3B, and will be discussed in further detail below.

First Main Cable Guide Apparatus

Figure 2:
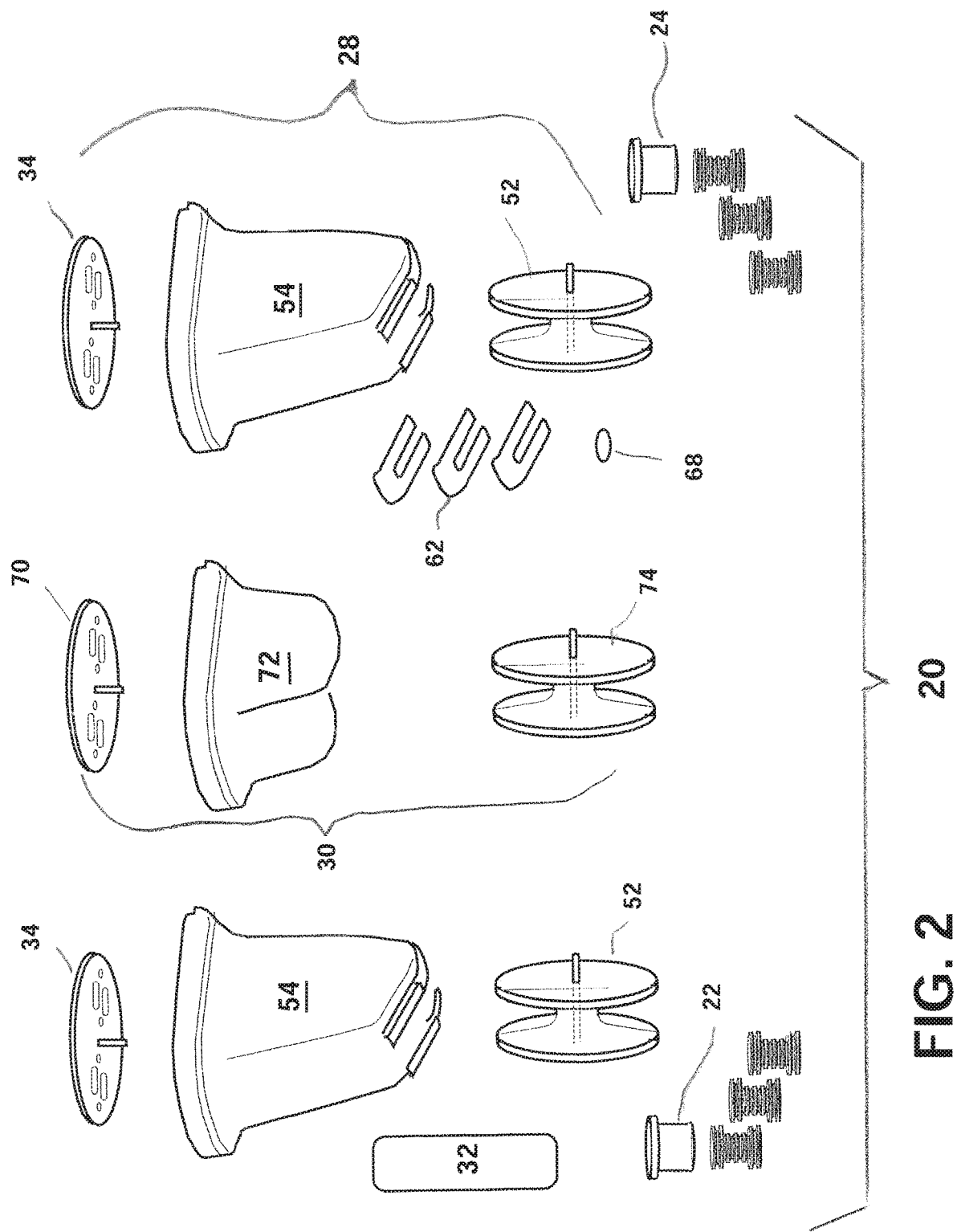
FIG. 2 is a perspective view showing components of a cable routing kit which, when installed in a user's garage, provides a cable routing system.
Figure 3A:
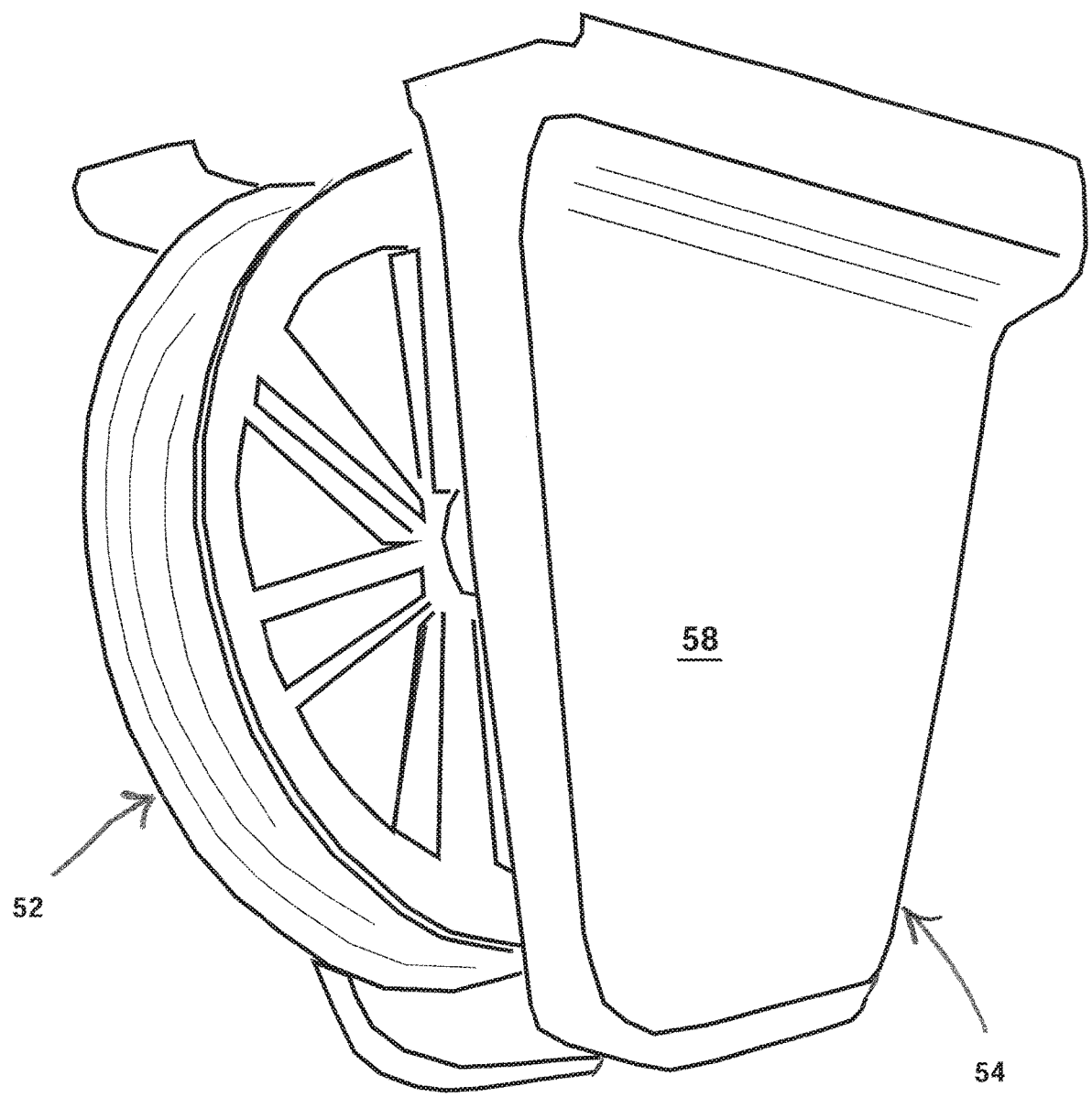
FIG. 3A is a perspective view of a cable routing apparatus or main cable guide assembly according to the first embodiment hereof.
Figure 3B:
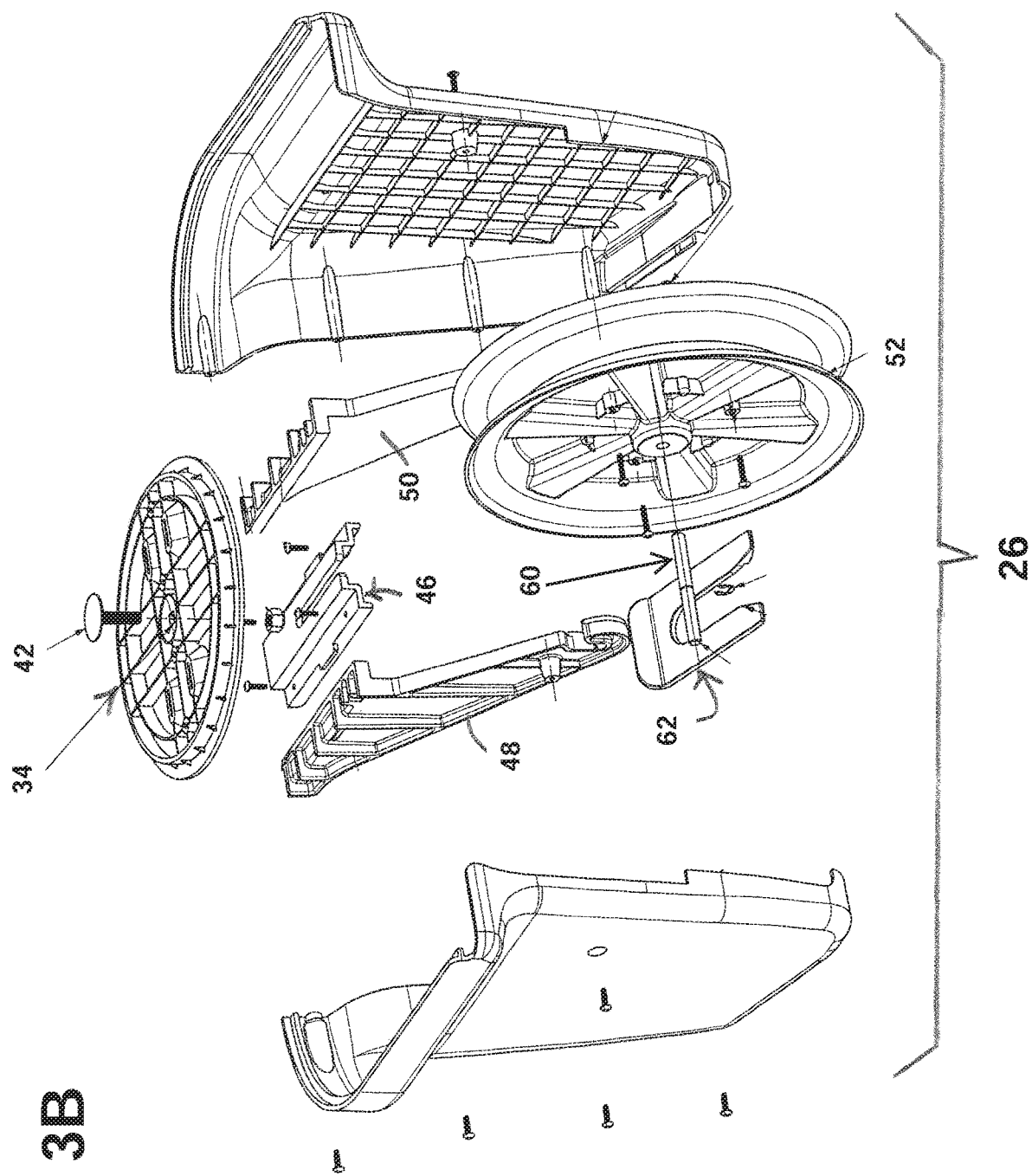
FIG. 3B is an exploded perspective view of the cable routing apparatus of FIG. 3A.

Referring now to FIGS. 2 and 3A-3B, the first main cable guide apparatus 26, according to the first illustrative embodiment of the kit 20 and system 120, includes a mounting plate 34, for attachment to a ceiling joist (not shown) inside the ceiling 110 of the garage using self-tapping screws, bolts or other appropriate fasteners (not shown). Such fasteners are commercially available.

Figure 4B:
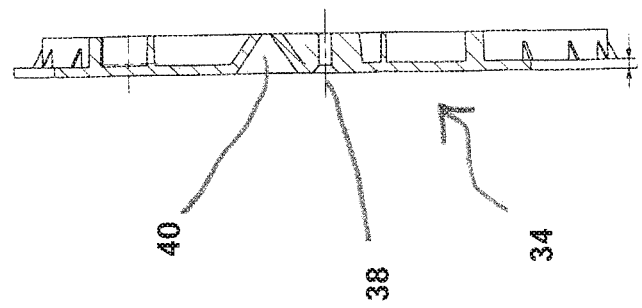
FIG. 4B is a cross-sectional view of the mounting plate of FIG. 4A, taken along the line B-B.
Figure 4A:
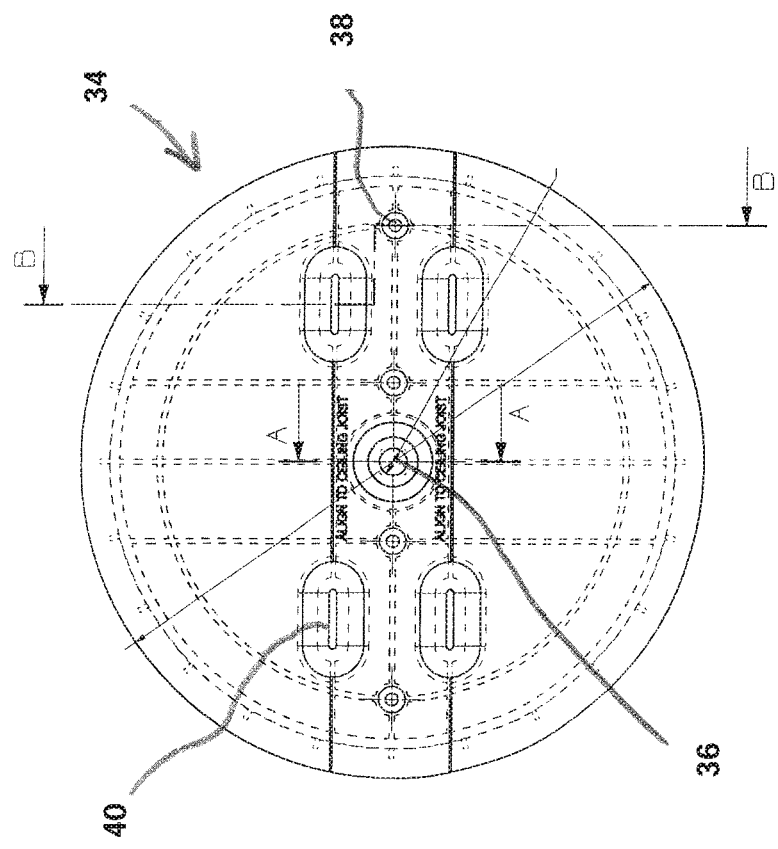
FIG. 4A is a plan view of a mounting plate which is a component of the cable routing apparatus of FIGS. 3A-3B.

The mounting plate 34 is shown in detail in FIGS. 4A-4B. The mounting plate 34 is formed of metal, fiberglass, or a strong plastic material, which may be reinforced. The mounting plate 34 has a central through-hole 36 formed therein, and a plurality of mounting holes 38, shown oriented substantially in line with one another, to receive the fasteners used to attach the mounting plate to the ceiling 110.

Optionally, the mounting plate 34 may also have guide slots 40 formed therein for use in aligning the plate with pre-marked edge portions of the ceiling joist on which the mounting plate is to be mounted. In the installed configuration thereof, the mounting plate 34 is oriented substantially horizontally, as shown in FIG. 3B.

Figure 5:
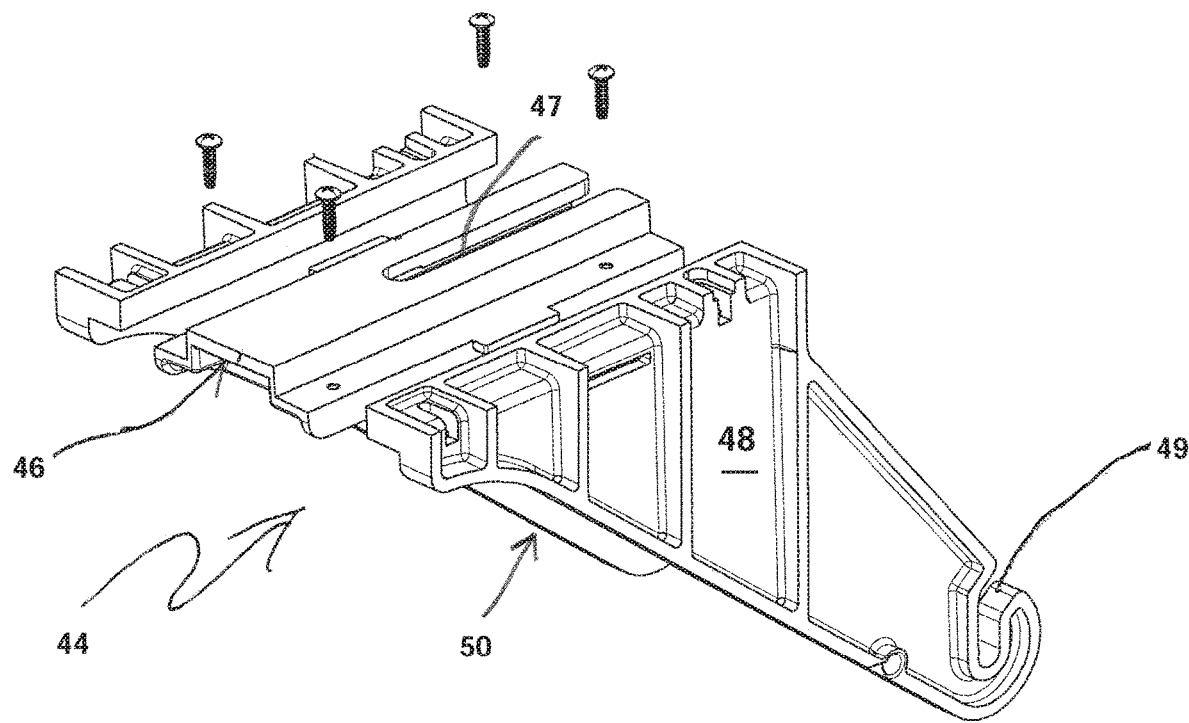
FIG. 5 is a perspective view of a pulley support member which is a component of the kit of FIG. 1.

Before installation of the mounting plate 34 on the ceiling 110, an elevator bolt 42 or other suitable fastener is inserted, extending downwardly through the through hole 38 formed through the center of the mounting plate 34, in order to provide a point of attachment for a pulley support member 44 (FIG. 5) of a pulley-bracket assembly so as to permit pivotal movement of the pulley-bracket assembly, in relation to the mounting plate.

The pulley-bracket assembly 44 includes an upper pulley support plate 46 for attaching the pulley-bracket assembly 44 to the elevator bolt 42, as well as first and second support arms 48, 50 attached to opposite side edge portions of the pulley support plate 46. The pulley-bracket assembly 44 may be formed in separate pieces which are assembled together, as shown in FIG. 3, or alternatively, the pulley-bracket assembly 44 may be molded as a one-piece integral part. Preferably, the pulley-bracket assembly 44 is made of high-strength material, such as fiberglass or a reinforced plastic.

The pulley support plate 46 is configured to be pivotally attached to the shaft of the elevator bolt 42, and for this reason, it has a central hole or slot 47 (FIG. 5) formed therein to receive the shaft of the elevator bolt 42 therethrough. A suitable fastener may be attached to the shaft of the elevator bolt 42 below the pulley support plate 46.

Alternatively, a threaded female fastener (not shown) may be molded directly into a central portion of the pulley support plate 46, and in this case, the pulley support plate (or the entire pulley-bracket assembly 44) may be threadably and rotatably attached to the shaft of the elevator bolt 42.

In another variation for attaching the pulley support member 44 to the mounting bolt 42, the shaft of the bolt 42 may be threaded only on an end portion thereof to receive the corresponding nut, and the pulley support plate 46 may simply be slidably installed on the upper, non-threaded shaft portion of the bolt.

In yet another variation, the pulley support plate 46 may be attached to the mounting plate 34 using a high-strength rivet (not shown), which permits pivotal movement of the pulley-bracket assembly 44 in relation to the stationary mounting plate 34.

Each of the first and second support arms 48, 50 of the pulley-bracket assembly 44 has a vertically-oriented slot 49 formed in the lower end thereof, as shown, to slidably and supportively receive an end portion of a pulley axle 60 therein.

The first (proximal) main cable guide apparatus 26 also includes a pulley wheel 52 which is rotatably attached between the arms 48, 50 of the pulley-bracket assembly 44 by the pulley axle 60. The pulley axle 60 and the pulley wheel 52 may be integrally formed together as a single unit.

Figure 6A:
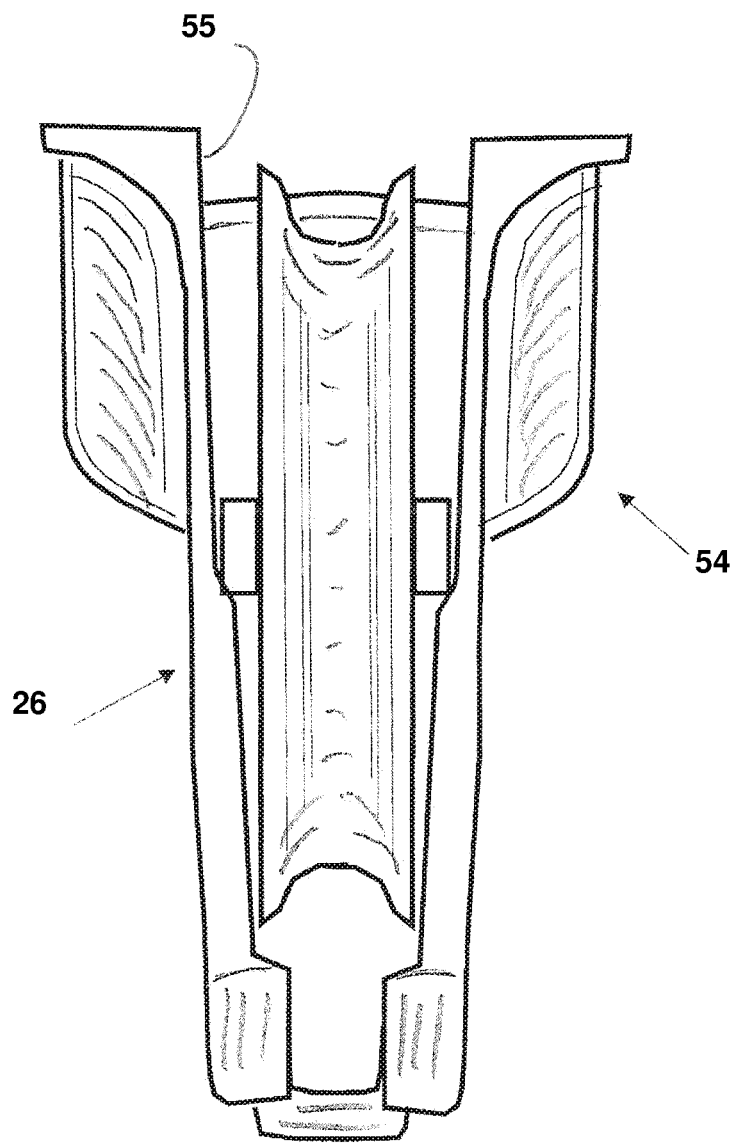
FIG. 6A is a front plan view of the cable routing apparatus of FIG. 3A.

The first (proximal) main cable guide apparatus 26 further includes an outer housing 54 formed from first and second shells 56, 58. As shown in FIG. 6A, the front edge of the housing is formed with a large open slot 55 therein to permit installation and removal of the pulley wheel 52 with attached pulley axle 60. To install the cable 100 in the apparatus 26, the pulley wheel 52 and axle assembly is removed through the slot 55, the cable is placed in the groove of the pulley wheel, and the pulley wheel and axle assembly is then inserted through the slot and installed back in place inside of the housing 54.

Figure 6B:
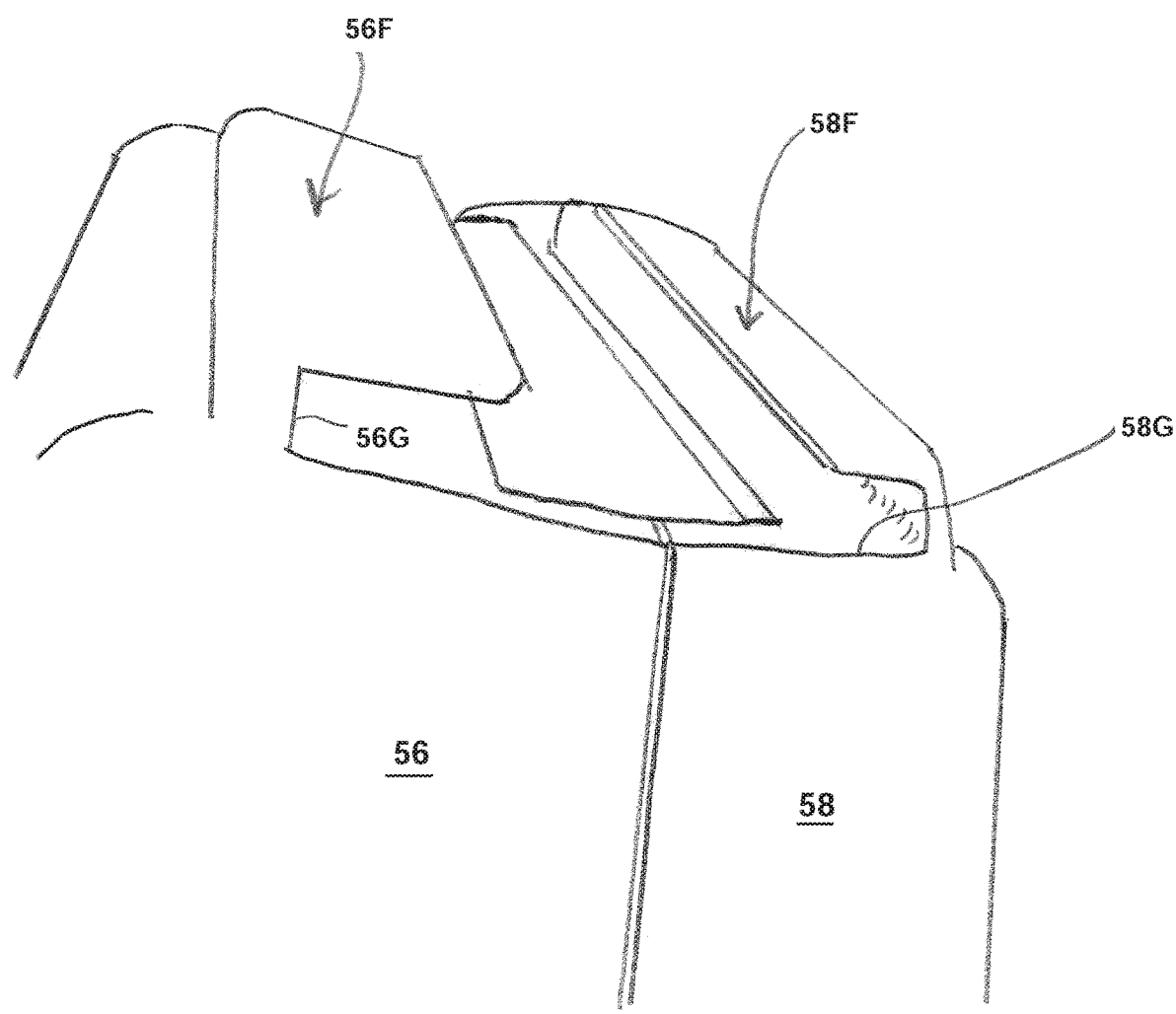
FIG. 6B is a detail perspective view showing a lower end portion of the cable routing apparatus of FIG. 6A.
Figure 6C:
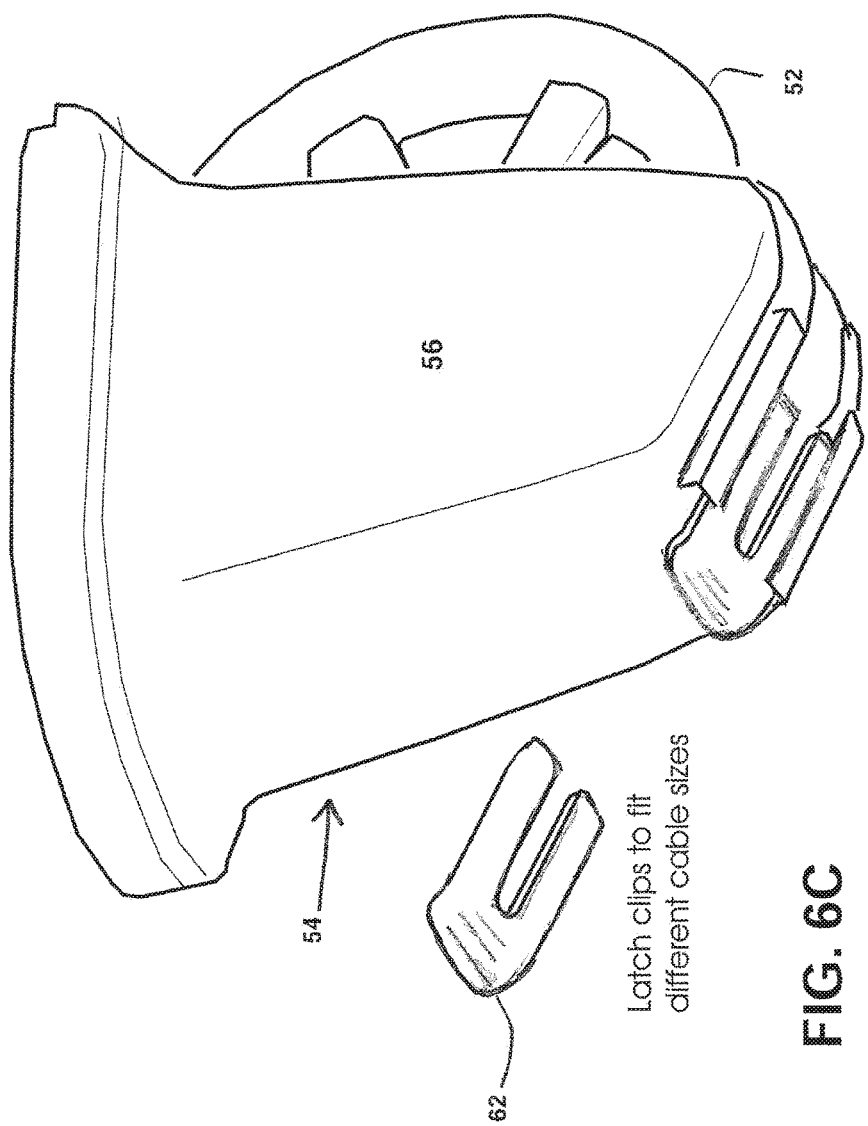
FIG. 6C is a perspective view of a second main cable routing apparatus according to the invention, illustrating slidable installation of a latch clip in a lower portion thereof.

As shown in FIG. 6B, each of the housing shells 56, 58 has a respective clip support flange 56F, 58F, having an L-shaped cross-section, integrally formed on a lower surface thereof. The clip support flanges 56F, 58F define grooves 56G, 58G which cooperate to slidably receive a latch clip 62 therein, which latch clip is used only with the second main cable guide apparatus 28.

Figure 7C:
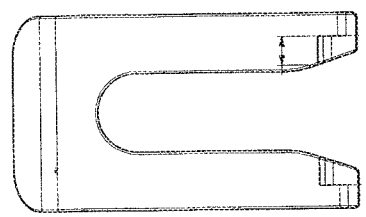
FIGS. 7A-7C are top plan, side plan and lower plan views of a latch clip.
Figure 7B:
Figure 7A:
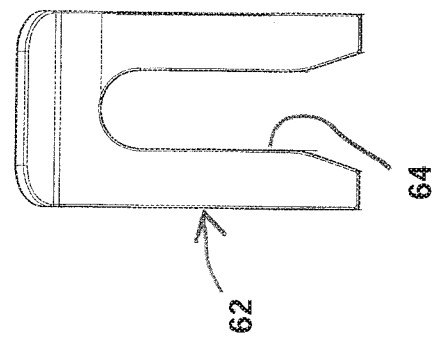

FIGS. 7A-7C show one example of a latch clip 62, provided to be slidably attached to a lower end of the housing 54. The latch clip 62 has a guide slot 64 formed centrally therein with a width narrower than the width of the stoppers 22, 24. The latch clip may, optionally, be provided with protrusions 66 thereon at an end portion thereof, as shown, to permit releasable engagement with the housing 54 at the inner ends of the clip support flanges 56F, 58F. Each of the kit 20 and system 120 includes a plurality of latch clips 62 having guide slots 64 of different widths, in order to correspond to the different sizes of cables 100 on the market. An end user will select the latch clip corresponding to his charging cable 100.

Other methods of attaching the latch clip 62 to the housing 54 may be used, such as a "snap-in" arrangement, spring clip, or other connecting mechanism known in the art.

Figure 8:
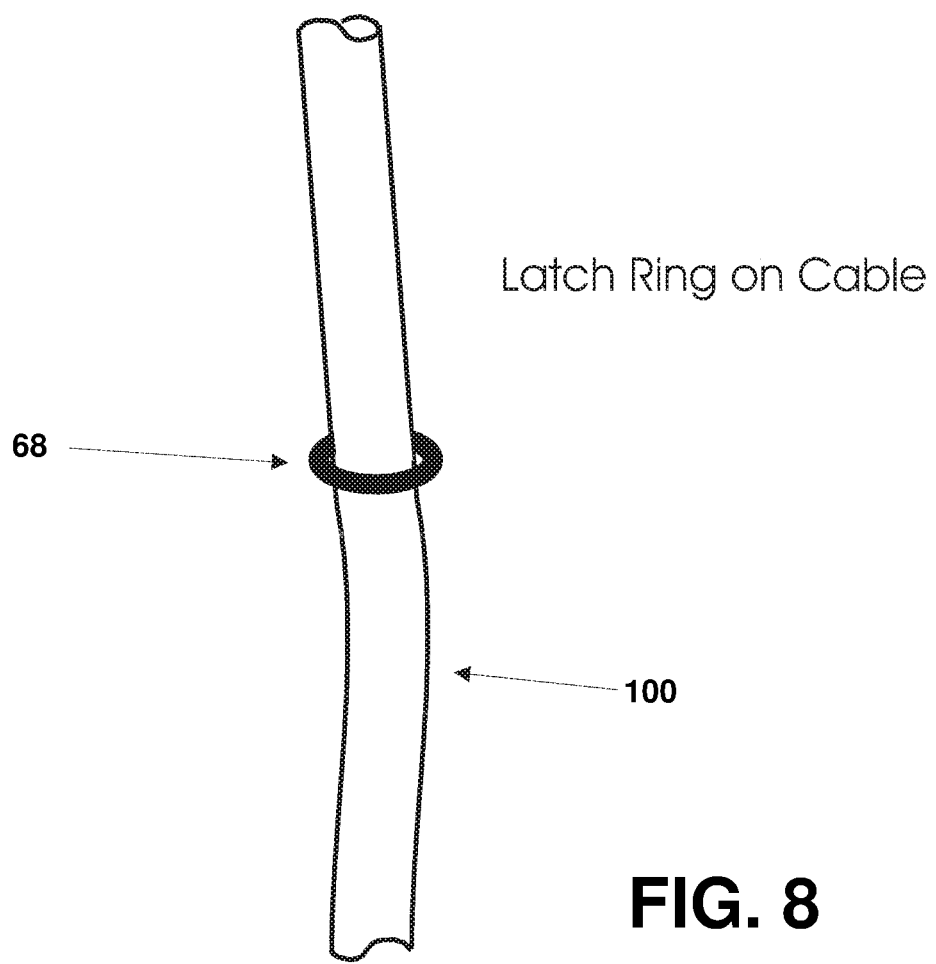
FIG. 8 is a detail perspective view of a portion of a charging cable with a latch ring installed thereon to cooperate with the latch clip in order provide strain relief to the cable.

Optionally but not necessarily, each of the kit 20 and system 120 may also include a plurality of different-sized latch rings 68 for attachment to the charging cable 100 (FIG. 8). Where used, the latch ring 68 is included as part of each of the kit 20 and system 120 in order to provide strain relief to the portion of the cable immediately adjacent the bottom of the housing during use. The latch ring 68 is selected in a size matching the diameter of the user's charging cable 100, and the latch ring 68 is slightly larger than the width of the guide slot 64 of the selected latch clip 62.

Each of the kit 20 and system 120 further includes at least one intermediate pulley bracket, such as that shown at 30.

Figure 9A:
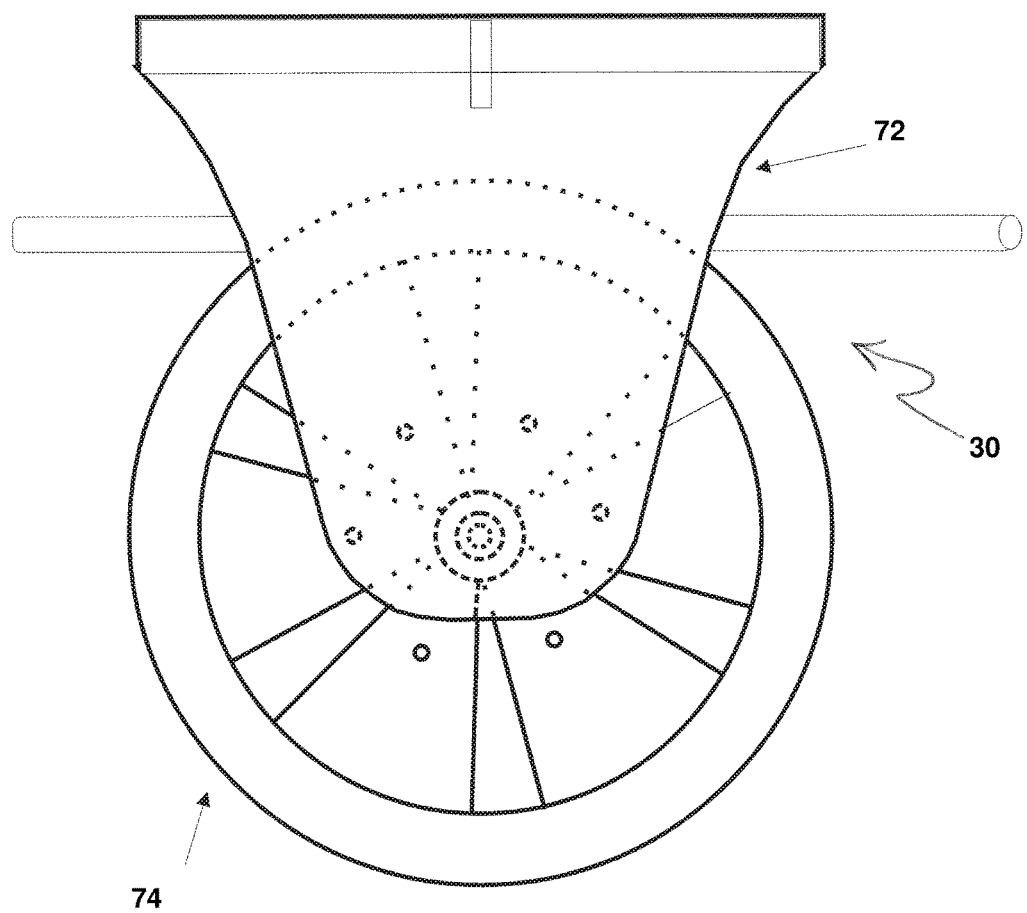
FIG. 9A is a side plan view of an intermediate pulley member which is another component of the kit of FIG. 2.
Figure 9B:
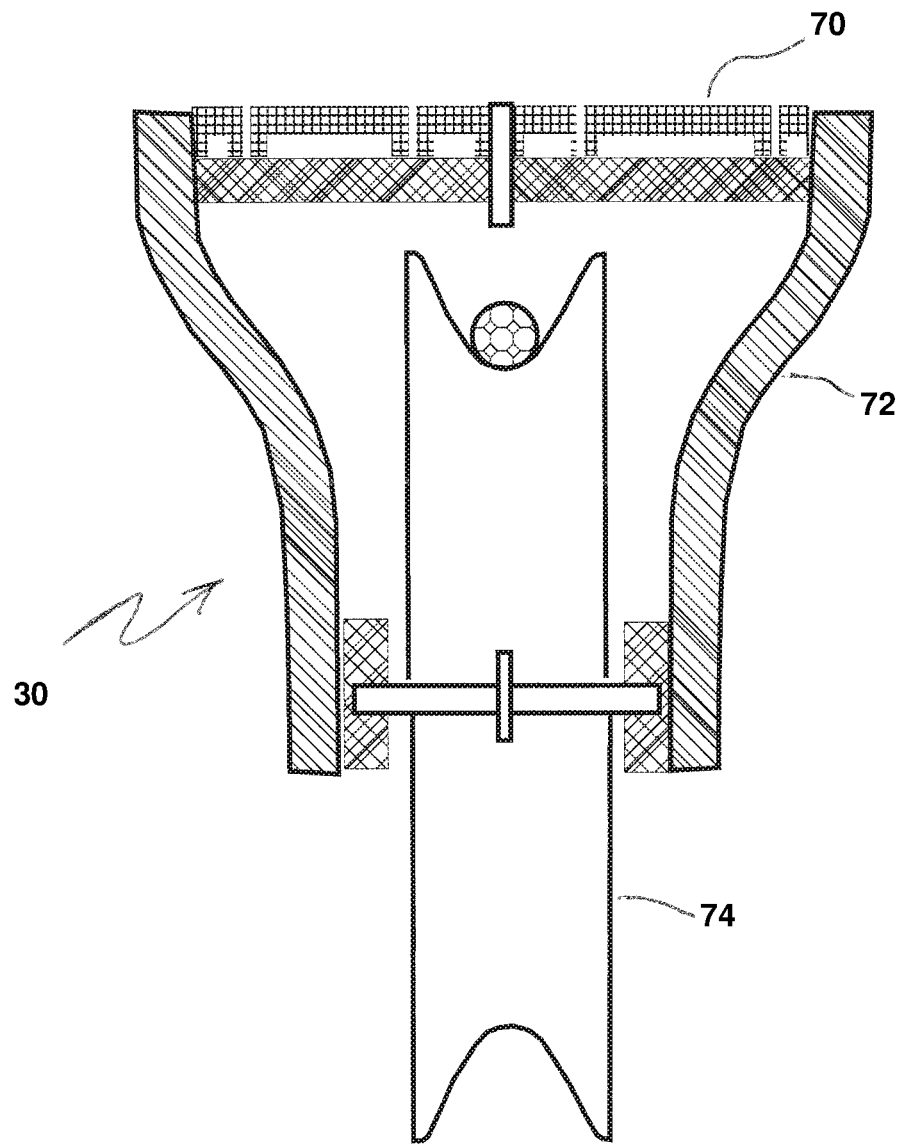
FIG. 9B is a front plan view of the intermediate pulley member.
Figure 10B:
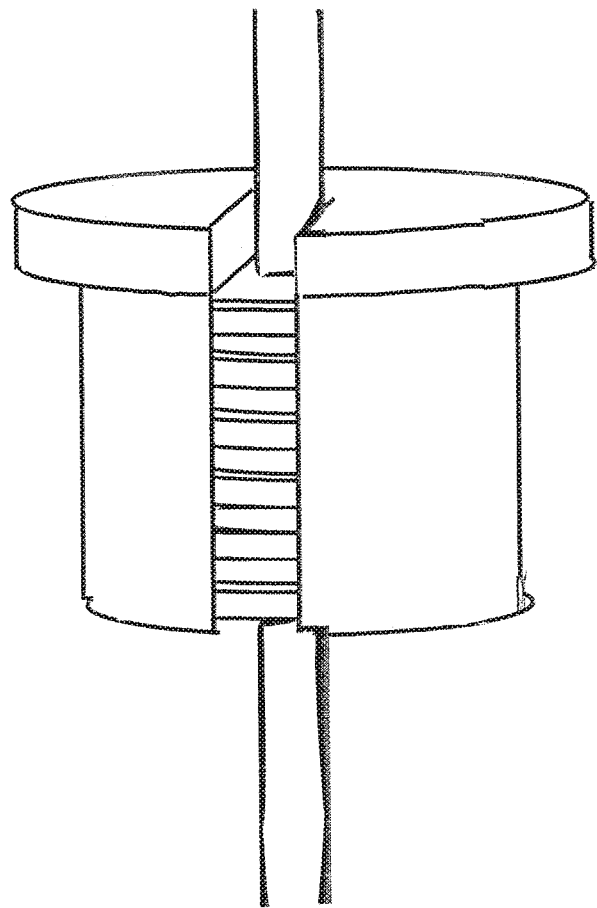
FIG. 10B is a detail view similar to FIG. 10A, but showing the stopper cover in place covering the stopper gasket.

As shown in FIGS. 9A-9B, the intermediate pulley bracket member 30 includes a mounting plate 70 for attachment to a wall or ceiling of the garage. In the depicted embodiment, the intermediate pulley bracket member 30 is configured to be attached to the ceiling by the mounting plate. The intermediate pulley bracket member 30 also includes at least one pulley support plate 72 affixed to the mounting plate 70 and extending downwardly therefrom, and a spool or pulley wheel 74 rotatably attached to the pulley support plate 54.

The intermediate pulley bracket 30 is constructed in a manner to allow relatively simple and straightforward installation of the charging cable 100 thereon, and the intermediate pulley bracket 30 is constructed in a manner to allow installation and removal of the charging cable 100 therefrom.

As noted above, the kit 20, according to the embodiment of FIG. 1A, also includes a second (distal) main cable guide apparatus 28, which is substantially identical to the first main cable guide apparatus 26 as previously described herein. The latch clip 62 and the latch ring 68 are intended to be used only with this second main cable guide apparatus.

Figure 12:
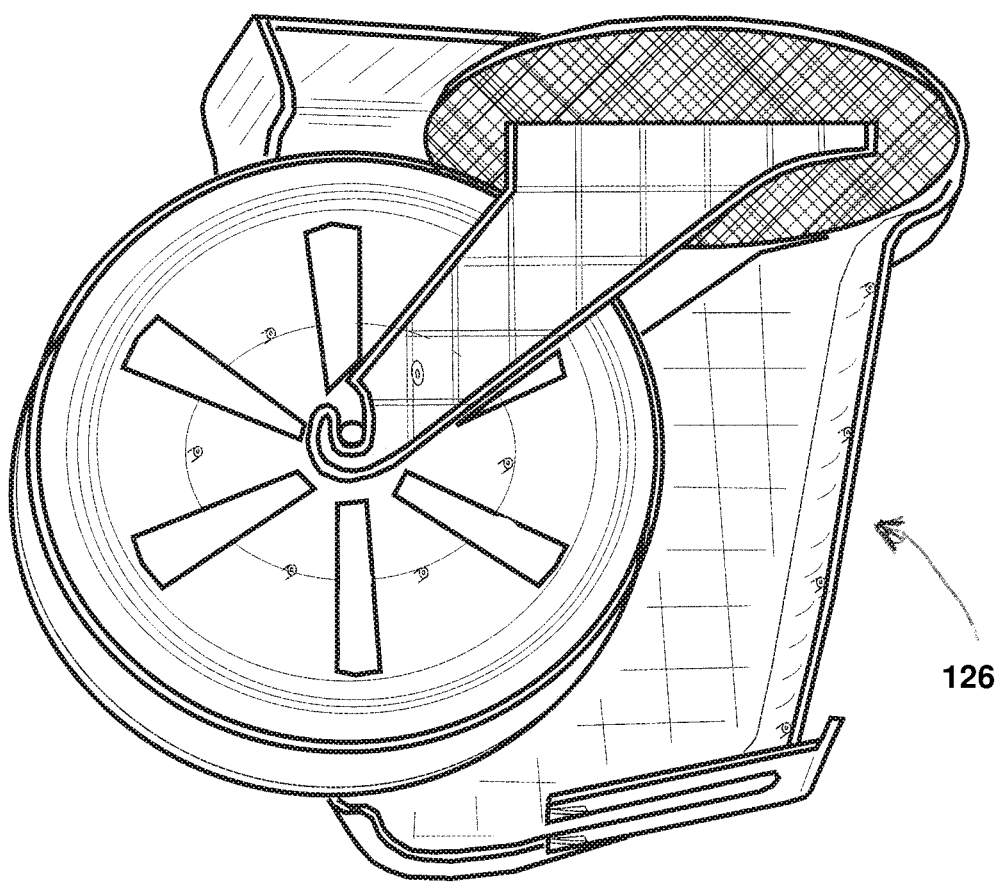
FIG. 12 is a perspective view, partially in phantom, showing a cable routing apparatus including the modified shell of FIGS. 11A-D.

FIGS. 11 and 12 illustrate a modified embodiment of the first main cable guide apparatus 126, in which the pulley bracket is integrally molded as a part of the housing 154.

The following lists unique features designed into the pulleys and pulley brackets used as part of the kit according to the present invention.

The pulleys are large in diameter and very deep. They also have a smooth polished finish. This keeps the cable in the center and prevents it from jumping out. This also minimizes chafing of the cable.

Optionally, the pulley brackets may be open on one side. This allows the owner to remove the cable if he or she wants to take it away from the garage.

The proximal (wall) and distal (vehicle) main cable guide apparatus 26, 28 are designed to work with the stoppers 22, 24 that are mounted on the cable. The stoppers 22, 24 control the height of the cable in both the "Stored" position and the In-Use" position.

It may then be appropriate to fine-tune stopper positions and the amount of weight needed for the counter weight 70, or other cable tensioning device.

Counter Weight Adjustment

Fill counter weight jug with water (or sand) to the line on the jug.

Hang the counter weight on the cable using the attachment.

With an assistant, add or remove water (or sand) so the cable floats nicely in the pulley system.

Positioning the First Stopper 22 at the Wall End of the Charging Cable 100

This stopper controls the amount of slack in the cable when it is plugged into the vehicle, and also works in conjunction with the latch clip 62 and the latch ring 68 of the second main cable routing apparatus 28 to ensure that the vehicle connector end of the cable is not placed under tension. Plug the cable into the vehicle. Select a stopper gasket corresponding to the diameter of the cable being used.

Fix the position of the stopper at the wall end so that it supports this amount of slack, by wrapping a tie strap around the inner gasket and tightening the strap, and then sliding the cylindrical cover portion of the stopper over the gasket.

Positioning the second stopper 24 at the vehicle charging end of the cable.

This stopper controls the height of the cable when it is in the "stored" position.

Slide the stopper up and down until you can walk under the end of the charging cable 100 when stored. Tighten the stopper.

The kit and system according to the invention is designed to work in almost any garage and support cabling for any make of vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the following claims, are intended to be within the scope and spirit of the present invention.

Having, thus, described the invention, I claim:

1. A cable routing apparatus for use with a charging cable which is configured to conduct electricity therethrough and is usable to selectively charge an electric vehicle, said cable routing apparatus comprising:
   a mounting plate configured to be fixedly attached to a ceiling in a substantially horizontal configuration, the mounting plate having a through hole formed therein;
   a pulley support member for pivotal attachment to the mounting plate, the pulley support member comprising a pulley support plate, and at least one pulley support arm for attaching to a first side portion of the pulley support plate, the at least one pulley support arm having an end portion with an opening formed therein to receive an end of a pulley axle;
   a pulley wheel having an arcuate groove extending therearound, the groove configured and dimensioned to receive a portion of the charging cable therein,
   and a pulley axle having a central axis extending through a central hub of the pulley wheel,
   wherein the pulley wheel, the pulley axle and the pulley support member cooperate to define a pulley-bracket assembly,
   and wherein the apparatus further comprises at least one stopper for attaching to a portion of the charging cable to limit movement thereof.

2. The cable routing apparatus of claim 1, further comprising a hollow housing member for covering the pulley-bracket assembly.

3. The cable routing apparatus of claim 1, wherein the pulley support member comprises first and second sections each having an L-shaped flange on a lower end thereof, the flanges cooperating to define a groove for receiving an accessory member.

4. The cable routing apparatus of claim 1, wherein the pulley support member comprises first and second sections having first and second pulley support arms integrally formed therein, respectively, to provide said at least one pulley support arm.

5. A cable routing kit comprising two of the cable routing apparatus of claim 1 and an intermediate pulley-bracket assembly comprising:
   an intermediate mounting plate for attachment to the ceiling,
   at least one side bracket attached to and extending downwardly from the intermediate mounting plate, and
   a pulley comprising a pulley wheel having an arcuate groove extending therearound to receive a portion of the charging cable therein, and a pulley axle having a central axis extending through a central hub of the pulley wheel.

6. The cable routing kit of claim 5, further comprising a cable retractor.

7. The cable routing kit of claim 5, further comprising two stoppers for attaching to the charging cable.

8. A method of installing a the cable routing kit of claim 5 in a garage having a wall, a ceiling and an electric vehicle charging cable with a proximal end situated close to the wall, the method comprising the steps of:
   a) inserting a connector for a first cable routing apparatus through the through hole of the mounting plate of the first cable routing apparatus, with a threaded shaft thereof extending downwardly;
   b) attaching the mounting plate of the first cable routing apparatus to a ceiling joist in a first area of the ceiling at a location proximate the wall, using a plurality of fasteners,
   c) placing the pulley support plate of a first pulley-bracket assembly over the threaded shaft of the connector, and threadably installing a retaining nut on the threaded shaft to pivotally attach the first pulley-bracket assembly to the mounting plate;
   d) inserting a connector for a second cable routing apparatus through the through hole of a mounting plate of the second cable routing apparatus, with a threaded shaft thereof extending downwardly;
   e) attaching the mounting plate of the second cable routing apparatus to a ceiling joist in a second area of the ceiling at a location proximate a parking area of an electric vehicle, using a plurality of fasteners,
   f) placing the pulley support plate of the second pulley-bracket assembly over the threaded shaft of the connector of the second cable routing apparatus, and threadably installing a retaining nut on the threaded shaft to pivotally attach the second pulley-bracket assembly to the second mounting plate;
   g) operatively attaching the mounting plate of the intermediate pulley-bracket assembly to a ceiling joist in a third area of the ceiling at an intermediate location between the first location and the second location, using a plurality of fasteners; and
   h) placing parts of the electric vehicle charging cable over the pulley wheels of the first cable routing apparatus, the intermediate pulley-bracket assembly and the second cable routing apparatus, respectively.

9. The cable routing apparatus of claim 1, further comprising a cable retractor.

10. The cable routing apparatus of claim 1, wherein the pulley axle and the pulley wheel are integrally formed together as a single unit.

11. A cable routing apparatus of claim 1 for use with a charging cable, said cable routing apparatus comprising:

a mounting plate configured to be fixedly attached to a ceiling in a substantially horizontal configuration, the mounting plate having a through hole formed therein:

a pulley support member for pivotal attachment to the mounting plate, the pulley support member comprising a pulley support plate, and at least one pulley support arm for attaching to a first side portion of the pulley support plate, the at least one pulley support arm having an end portion with an opening formed therein to receive an end of a pulley axle, a pulley wheel having an arcuate groove extending therearound to receive a portion of the cable therein, and a pulley axle having a central axis extending through a central hub of the pulley wheel, wherein the pulley wheel, the pulley axle and the pulley support member cooperate to define a pulley-bracket assembly, and wherein the pulley support plate has a slot formed therein to slidably receive a portion of a connector and to permit pivotal attachment of the pulley-bracket assembly to the mounting plate.

12. The cable routing apparatus of claim 11, further comprising a cable retractor.

13. The cable routing apparatus of claim 11, wherein the apparatus further comprises at least one stopper for attaching to a portion of the charging cable to limit movement thereof.

14. A cable routing apparatus for use with a charging cable configured to conduct electricity therethrough and usable to selectively charge an electric vehicle, said cable routing apparatus comprising:

a mounting plate configured to be fixedly attached to a ceiling in a substantially horizontal configuration, the mounting plate having a through hole formed therein;

a pulley support member for attachment to the mounting plate, the pulley support member comprising a pulley support plate, a first pulley support arm for attaching to a first side portion of the pulley support plate, and a second pulley support arm for attaching to a second side portion of the pulley support plate, each of the pulley support arms having an end portion with an opening formed therein to receive an end of a pulley axle; and a pulley wheel having an arcuate groove extending therearound, the groove configured and dimensioned to receive a portion of the charging cable therein, and a pulley axle having a central axis extending through a central hub of the pulley wheel, wherein the pulley wheel, the pulley axle and the pulley support member cooperate to define a pulley-bracket assembly, and wherein the openings in the pulley support arms are each configured as a vertically-oriented slot which is open at an upper end thereof, to permit selective installation and removal of the pulley wheel and pulley axle.

15. The cable routing apparatus of claim 14, further comprising a hollow housing member for covering the pulley-bracket assembly.

16. The cable routing apparatus of claim 15, wherein the pulley support member comprises first and second sections having the first and second pulley support arms integrally formed therein, respectively.

17. The cable routing apparatus of claim 14, wherein the pulley support member comprises first and second sections each having an L-shaped flange on a lower end thereof, the flanges cooperating to define a groove for receiving an accessory member.

18. The cable routing apparatus of claim 14, wherein the pulley support plate has a slot formed therein to slidably receive a portion of a connector and to permit pivotal attachment of the pulley-bracket assembly to the mounting plate.

19. The cable routing apparatus of claim 14, further comprising a cable retractor.

20. The cable routing apparatus of claim 14, wherein the apparatus further comprises at least one stopper for attaching to a portion of the charging cable to limit movement thereof.

* * * * *